Sept. 14, 1937.                C. R. JOHNSON                 2,093,275
                        ELECTRIC BLASTING INITIATOR
                          Filed July 6, 1936            2 Sheets-Sheet 1
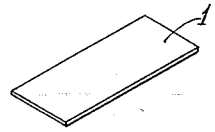
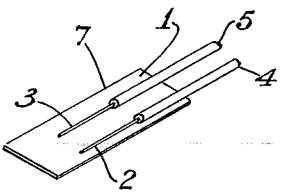
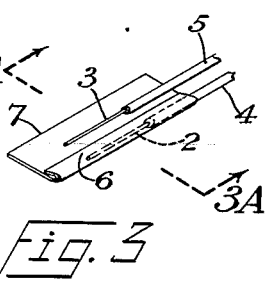
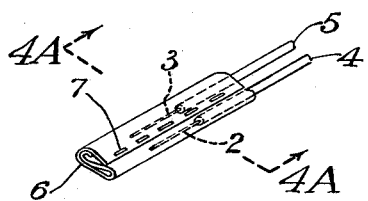
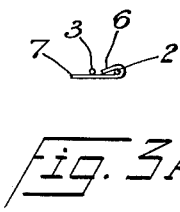
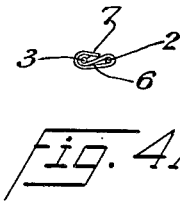
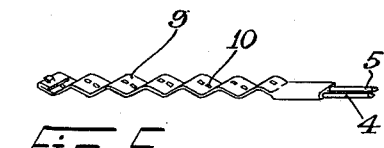
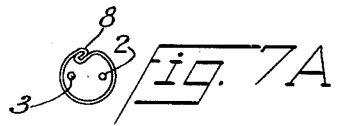
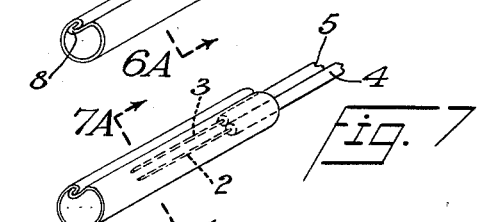
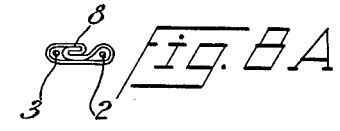
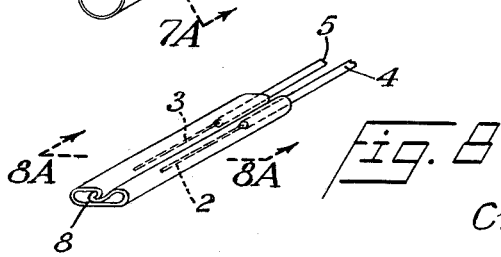
Charles R. Johnson, INVENTOR
BY
Benton A. Bull ATTORNEY Sept. 14, 1937.   C. R. JOHNSON   2,093,275
ELECTRIC BLASTING INITIATOR
Filed July 6, 1936   2 Sheets—Sheet 2
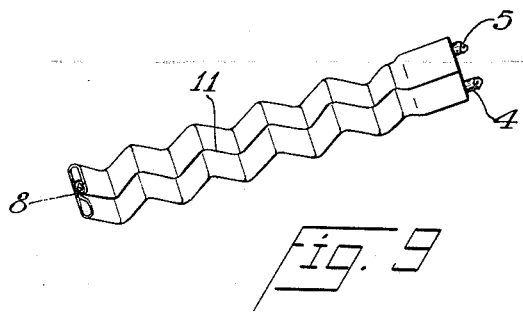
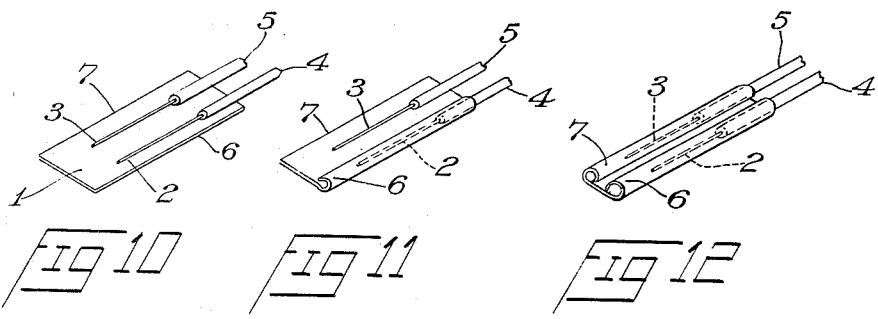
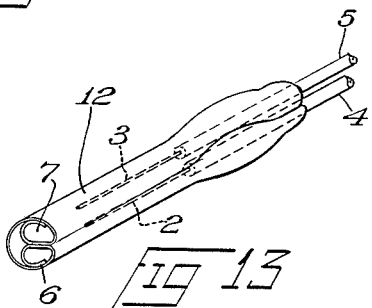
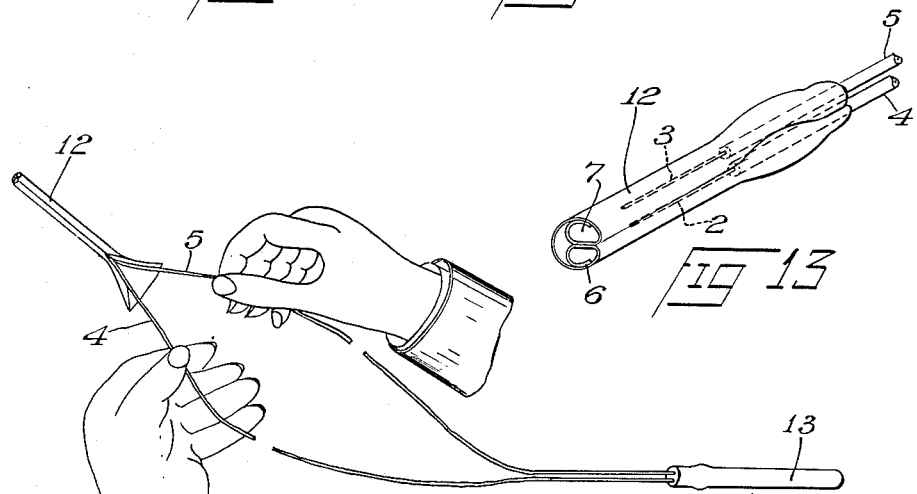
Charles R. Johnson, INVENTOR
BY
Benton A. Bull ATTORNEY Patented Sept. 14, 1937

2,093,275

UNITED STATES PATENT OFFICE 2,093,275

ELECTRIC BLASTING INITIATOR

Charles R. Johnson, West Chester, Pa., assignor to E. I. du Pont de Nemours & Company, Wilmington, Del., a corporation of Delaware Application July 6, 1936, Serial No. 89,024

14 Claims. (Cl. 102—10)

The present invention relates generally to electric blasting initiators and more particularly to a new and improved protective means which effectively guards the initiator against inadvertent firing by stray sources of electrical energy.

As is well known, the leg wires of electric blasting initiators not infrequently come in contact with stray sources of electrical energy which are capable of prematurely firing the cap unless it is adequately protected therefrom. The protective means employed for this purpose should, above all other considerations, be absolutely reliable under all conditions of use. This general problem is not, in itself, difficult of solution. It is highly desirable, however, that the protective means employed should be such that it may be readily attached to the initiator, and easily removable by the user when desired, without deformation of the bare ends or impairment of the electrical connections subsequently made to the blasting machine. The ideal protective means is therefore one which affords effective electrical protection, is easily attached, is easily stripped from the wires by the user when desired, but is not readily damaged or inadvertently removed.

From the foregoing it is apparent that the ideal protective means is an exceedingly difficult one to devise. It is not strange, therefore, that a great number of protective means have been proposed heretofore in an attempt to solve these various problems. The means heretofore proposed for this purpose may be conveniently classified as (A) non-conducting protective means, such as a rubber sleeve cemented or vulcanized about the wires; and (B) shunts or conducting protective means which short the firing circuit of the initiator. The shunts proposed were of two general types, namely: (1) internal shunts enclosed within the cap shell; and (2) external shunts, comprising (a) the wires themselves suitably held together, for example by twisting; and (b) the wires connected by an auxiliary conducting means, for example solder, a compressed metal plug, metallic clips, snaps, and similar means.

The various protective means heretofore proposed have been unsatisfactory for various reasons. Thus, the non-conducting protective means, such as the rubber sheath for example, are difficult to remove from the wires, and since the sheath is attached thereto by means of glue or cement, the wires must be carefully scraped and cleaned after the rubber sheath has been torn therefrom. On the other hand, the conducting protective means, or shunts, necessitate an effective, electrically conducting connection between the leg wires, since these means, without exception, leave a portion of the bare leg wire exposed to the stray sources of electricity. It is apparent, therefore, that the effectiveness of the shunts heretofore employed depended upon the care with which this connection was made, and upon its ruggedness under actual conditions in use.

Of the external shunts, those involving the solder or twisted leg wires or compressed metal plugs are difficult to remove, or otherwise inconvenient in use, whereas those involving various spring clips, snaps, buttons and the like are so readily damaged or removed as to be dangerous under the usual conditions of actual use.

On the other hand, the internal shunts, such as the fusible auxiliary resistance element, are also disadvantageous since they are relatively difficult to assemble in large scale manufacture, and in addition, afford no protection whatsoever after the cap has once come in contact with a stray current capable of fusing the auxiliary resistance.

The object of my invention is to overcome the disadvantages of the protective means heretofore employed. A further object is a protective means, the effectiveness of which does not depend solely on the establishment of an electrical connection between the leg wires. A still further object is a protective means which affords effective electrical protection, is easily attached, readily torn from the wires by the user when desired, but is not readily damaged or inadvertently removed under the most adverse conditions of actual use.

I have found that the foregoing objects may be accomplished by jointly embracing each of the insulated end portions of the leading wires with a protective means comprising a suitable material of thin cross section, such as metallic foil, said material having a strength sufficient to substantially prevent inadvertent removal of said means, yet insufficient to prevent the intentional removal thereof by manually drawing said leading wires apart. As employed hereinafter in the specification and the appended claims, the word "embrace" is to be understood to mean "grasp", "encircle", or "encompass". For the purpose of my invention, I have found that the particular material of thin cross-section selected should meet a number of requirements. In the first place, the material must have sufficient tensile strength so that the finished protective device resists deformation and removal. Secondly, the material should be non-elastic in nature, so that when compressed about the wires, it locks permanently into position, and does not tend to spring back to its original shape. Thirdly, the material should be water-proof in order to withstand the adverse effects of water in actual use. And lastly, the material should be of such a nature that the protective device may be torn, for example, along the axis of the leg wires, when the wires are pulled apart by the fingers of the user.

Various materials are known which meet these requirements, but I have found that metallic foils of various sorts are particularly desirable. Because of the requirements mentioned above, however, not all types and thicknesses of commercially available metallic foil are satisfactory. Thus, for example, the thin form of tin and lead foil which is commonly employed in food and cigarette wrappers is too limber and mechanically too weak for the purpose of my invention. Other types of foil in the heavier thicknesses are mechanically too resistant to shearing forces to permit the removal of the protective means without the use of tools such as pliers, or too elastic to be permanently locked about the wires. The metallic foils contemplated by my invention are those which possess a resistance to tearing not substantially greater than that of pure aluminum foil approximately 0.008 inch thick, and preferably those having a resistance to deformation or bending stresses, not substantially less than that of pure aluminum foil approximately 0.003 inch thick. For a given foil, the satisfactory limits of thickness will, of course, depend on the nature of the material itself. Thus with softer metals, a thicker foil is necessary, whereas for brittle or stiff foils, a thinner stock may be used.

While foils of various metals may be employed in accordance with my invention, I have found that aluminum, brass, and copper foils are particularly satisfactory because of their desirable physical and electrical properties and their ready availability. Other metals may, of course, be substituted for these materials, provided the foils meet the requirements above mentioned.

The protective means in accordance with my invention may be formed if desired by placing the parallel wires lengthwise on a strip of suitable metallic foil as above described, so that the wires are approximately parallel to the center line of the metallic sheet, which is long enough to extend beyond the end of the bare wire and also beyond the termination of the insulation. One lengthwise edge of the foil is folded over and across the wires and then the other lengthwise edge is folded over the first so as substantially to enclose the wires and leave no portion of the bare terminal ends extending beyond the protective device. This folding of the metallic sheet is preferably extended beyond the outer end where the edges are pressed flat, or bent back upon itself so that even the ends of the wires are enclosed within the device. The device is then locked about the wires in various ways which will be described more fully hereinafter.

In order to disclose my invention more clearly, reference is made to the accompanying drawings which illustrate several embodiments thereof. It is understood, however, that this is done solely by way of illustration and is not to be regarded as a limitation on the scope of my invention which has many important embodiments other than those hereinafter more fully described.

Referring generally to the drawings, the figures are perspective views showing the various phases of my invention. Figures 1 to 5 illustrate the steps involved in forming one embodiment; Figures 6 to 9 illustrate the steps involved in forming a second embodiment; while Figures 10 to 13 represent the steps involved in forming a third embodiment of my invention. Figure 14 is a perspective view showing the method of removing my preferred protective means from the leg wires of an electric blasting cap at the time of use.

Similar characters are used in the drawings and throughout the accompanying description to refer to corresponding parts.

Figure 1 represents a perspective view of a suitable strip of aluminum foil I having a thickness of about 0.005 of an inch. The bare ends 2 and 3 of the leading wires 4 and 5 are placed on the strip of foil, as illustrated in Figure 2, so that the termination of the insulation may be embraced by the foil. The longitudinal edge 6 of the foil strip I is then folded over the bare end 2 and the termination of the insulation on the wire 4 in the manner illustrated by Figures 3 and 3—A. The longitudinal edge 7 is then folded over the bare end 3, the termination of the insulation on the wire 5, and the folded edge 6 which embraces the wire 4, as shown in Figures 4 and 4—A. To lock the protective device in position, the foil is then perforated in a number of places down the median line of the protective device, and finally corrugated to form the assembly represented by Figure 5.

A second embodiment of my invention may be made by forming the cylindrical tube illustrated in Figures 6 and 6—A, from the strip shown in Figure 1. This tube is provided with an interlocking seam 8. The bare ends 2 and 3 of the wires 4 and 5 are inserted in the tube in the manner illustrated in Figures 7 and 7—A. The tube is then compressed about the wires to form the assembly shown in Figures 8 and 8—A. To lock the protective device to the wires, the assembly is corrugated as illustrated in Figure 9.

A third embodiment of my invention is prepared by placing the bare ends 2 and 3 of the leg wires 4 and 5 on a strip of metallic foil I, as illustrated in Figure 10; rolling the edge 6 inwardly about the bare wire 2 and a portion of the insulated wire 4, as illustrated in Figure 11; rolling the edge 7 about the bare end 3 and a portion of the insulated wire 5 as shown in Figure 12; and then rolling the two wires inwardly toward each other. The protective device is then compressed very tightly about the termination of the insulation to affix it to the leg wires, forming the assembly shown in Figure 13. If desired the protective device may be compressed tightly about the bare ends 2 and 3, although this is ordinarily unnecessary if the foil is tightly compressed about the termination of the insulation.

Figure 14 indicates the manner in which the user of an electric blasting initiator in accordance with my invention may remove my improved protective means. The leg wires are simply pulled apart with the fingers as indicated in the drawings, the metallic foil tearing, usually along the longitudinal axis, when the wires are drawn apart.

The advantages of my improved protective means are numerous and important. In the first place, it will be apparent to any one skilled in the art that the means will afford effective electrical protection even if the metallic foil, because of a faulty electrical contact with the wires, fails to short circuit the cap. Thus my improved protector does not necessitate the establishment of an electrically conducting relationship between the wires, although this additional protection will ordinarily be afforded by the contact of the wires with the foil or with each other. It is, therefore, unnecessary carefully to clean the surface of the foil before manufacturing the protector. Indeed, either or both surfaces of the metallic foil may be intentionally covered with a suitable dielectric if desired, without in any way minimizing the effectiveness of the protector. Thus, for example, I may employ lacquered, shellacked, varnished, painted, paper-covered, or anodically oxidized foil if desired. Any suitable dielectric may be used since the character or amount of the dielectric employed is immaterial in these cases, so long as it does not substantially prevent the protector from being torn from wires in the manner described.

A second advantage of my protector is the fact that its small size relative to the diameter of the wire minimizes the possibility of its being inadvertently torn from the wires. This fact, coupled with the locking accomplished by the corrugations, perforations and/or crimping about the insulation, makes it almost impossible to pull the protector longitudinally off the ends of the wires without the use of suitable tools, for example, a pair of pliers.

A third advantage of my protector is the fact that although it is not easily damaged or inadvertently removed, it may nevertheless be removed by the user when desired by the simple expedient shown in Figure 14. Because of the character of the material used, (i. e., a metallic foil capable of being torn) the protector will tear, usually on its longitudinal axis, thereby permitting the protector to be removed. In addition, the wires will not be deformed or impaired for the electrical connections subsequently made to the blasting machine.

A fourth advantage of my protector, which also derives from the nature of the material employed, is the ease with which the means may be fabricated and applied to the wires. The working characteristics of the foil contemplated by my invention make it possible to affix the protector firmly to the wires by means of simple mechanical devices and machines, thereby effecting not only a substantial economy but also a great reduction in the number of man-hours exposure to danger per million initiators manufactured. My improved protective means has therefore very decided advantages over prior means.

In the foregoing detailed description of my invention it is apparent that many variations may be made without departing from the spirit and scope thereof. I intend, therefore, to be limited only in accordance with the following patent claims:

I claim:

1. The process of forming a protective device for an electric blasting initiator provided with insulated leading wires having uninsulated end portions, which process comprises rolling one edge of a strip of metallic foil about one of said uninsulated end portions, rolling the second edge of said metallic strip about the other of said uninsulated end portions, rolling the two wrapped uninsulated end portions inwardly toward each other, and compressing the foil about said leading wires to effect a firm adherence thereto.

2. The process of forming a protective device for an electric blasting initiator provided with insulated leading wires having uninsulated end portions, which process comprises rolling one edge of a strip of metallic foil about one of said uninsulated end portions and the termination of said insulation on said leading wires, rolling the second edge of said strip about the other of said uninsulated end portions and the termination of the insulation on said leading wires, rolling the two wrapped uninsulated end portions inwardly toward each other, and compressing the foil about said leading wires to effect a firm adherence thereto.

3. In combination with a blasting initiator adapted for electrical firing and provided with insulated leading wires having uninsulated end portions, protective means comprising metal of thin cross-section, said protective means jointly embracing at least a part of each of said uninsulated end portions, whereby to protect said initiator from inadvertent firing by stray sources of electrical energy, said protective means having a resistance to tearing not substantially greater than that of pure aluminum foil approximately 0.008 inch thick.

4. In combination with a blasting initiator adapted for electrical firing and provided with insulated leading wires having uninsulated end portions, protective means comprising metal of thin cross-section, said protective means jointly embracing each of said uninsulated end portions, whereby to protect said initiator from inadvertent firing by stray sources of electrical energy, said protective means having a resistance to tearing not substantially greater than that of pure aluminum foil approximately 0.008 inch thick.

5. In combination with a blasting initiator adapted for electrical firing and provided with insulated leading wires having uninsulated end portions, protective means comprising metal of thin cross-section, said protective means jointly embracing each of said uninsulated end portions, whereby to protect said initiator from inadvertent firing by stray sources of electrical energy, said protective means having a resistance to tearing not substantially greater than that of pure aluminum foil approximately 0.008 inch thick, and a resistance to deformation sufficient to enable said means of itself to grip said wires, whereby to prevent the inadvertent removal of said means.

6. In combination with a blasting initiator adapted for electrical firing and provided with insulated leading wires having uninsulated end portions, protective means comprising metal of thin cross-section, said protective means jointly and completely embracing each of said uninsulated end portions, whereby to protect said initiator from inadvertent firing by stray sources of electrical energy, said protective means having a resistance to tearing not substantially greater than that of pure aluminum foil approximately 0.008 inch thick, and a resistance to deformation sufficient to enable said means of itself to grip said wires, whereby to prevent the inadvertent removal of said means.

7. In combination with a blasting initiator adapted for electrical firing and provided with insulated leading wires having uninsulated end portions, protective means comprising metal of thin cross-section, said protective means jointly embracing each of said uninsulated end portions, whereby to protect said initiator from inadvertent firing by stray electrical currents, said protective means having a resistance to tearing not substantially greater than that of pure aluminum foil approximately 0.008 inch thick, and a resistance to deformation not substantially less than that of pure aluminum foil approximately 0.003 inch thick, whereby said protective means may be locked about said wires to substantially prevent the inadvertent removal of said means.

8. In combination with a blasting initiator adapted for electrical firing and provided with insulated leading wires having uninsulated end portions, protective means comprising metal of thin cross-section, said protective means jointly and completely embracing each of said uninsulated end portions and the termination of the insulation on each of said leading wires, whereby to protect said initiator from inadvertent firing by stray electrical currents, said protective means having a resistance to tearing not substantially greater than that of pure aluminum foil approximately 0.008 inch thick, and a resistance to bending not substantially less than that of pure aluminum foil approximately 0.003 inch thick, whereby said means of itself is capable of gripping said wires sufficiently firmly to substantially prevent the inadvertent removal of said means.

9. The combination of claim 7 wherein at least one surface of said metal is covered with a dielectric material.

10. The combination of claim 7 wherein the inner surface of said metal, in contact with said uninsulated end portions, is lacquered.

11. The combination of claim 7 wherein said metal of thin cross-section consists of metallic foil.

12. The combination of claim 7 wherein said metal of thin cross-section consists of aluminum foil approximately 0.005 inch thick, at least the inner surface of said foil being lacquered.

13. The combination of claim 8 wherein said protective means comprises a strip of metallic foil folded and interlocked about said uninsulated end portions and the termination of the insulation, said protective means being corrugated whereby to assure a firm adherence of said means to said wires and to prevent the inadvertent removal therefrom.

14. The combination of claim 8 wherein said protective means comprises a strip of metallic foil, each longitudinal edge of which is rolled inwardly about one of said uninsulated end portions and the termination of the insulation thereon, said protective means being firmly compressed at least about the termination of the insulation to effect a firm adherence thereto and to prevent the inadvertent removal therefrom.

CHARLES R. JOHNSON.